United States Patent [19]
Collette et al.

[11] Patent Number: 4,721,141
[45] Date of Patent: Jan. 26, 1988

[54] ASYMMETRICAL TIRE PITCHING TECHNIQUES

[75] Inventors: Jean Collette, Michamps; Alain Klepper, Neufchâteau, both of Belgium

[73] Assignee: The Goodyear Tire and Rubber Company, Akron, Ohio

[21] Appl. No.: 865,448

[22] Filed: May 21, 1986

[51] Int. Cl.$^4$ .............................................. B60C 11/00
[52] U.S. Cl. ............................ 152/209 A; 152/209 R
[58] Field of Search ........... 152/209 R, 209 D, 209 A

[56] References Cited

U.S. PATENT DOCUMENTS

| | | | |
|---|---|---|---|
| 2,255,994 | 9/1941 | Bush et al. | 152/209 R |
| 2,808,867 | 10/1957 | Buddenhagen et al. | 152/209 R |
| 4,474,223 | 10/1984 | Landers | 152/209 R |

FOREIGN PATENT DOCUMENTS 0114594 12/1983 European Pat. Off. .

Primary Examiner—Michael Ball
Attorney, Agent, or Firm—L. R. Drayer; Ronald E. Larson

[57] ABSTRACT

A tire adapted to rotate around an axis and having an outer surface defining a circumferentially extending center line that defines a center plane perpendicular to the axis. The center plane divides the tire into first and second portions. The tire includes a first series of design cycles extending circumferentially around the tire in the first portion and a second series of design cycles extending circumferentially around a tire in the second portion. The total number of design cycles in the first and second portions are equal, and the sequences of the design cycles used in the first and second portions are different in order to spread the noise generated by the tire over a broad band of frequencies.

2 Claims, 1 Drawing Figure

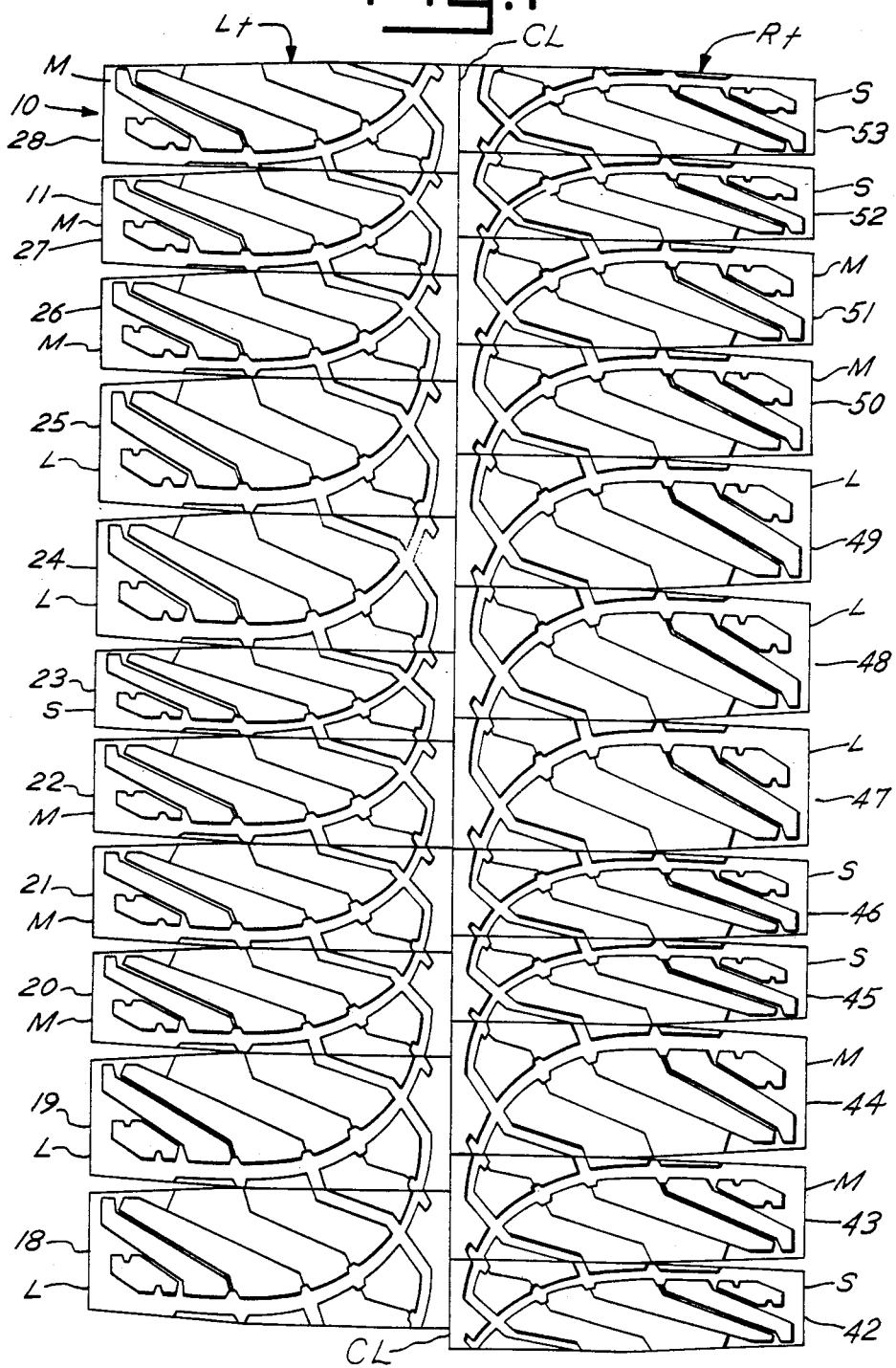

ASYMMETRICAL TIRE PITCHING TECHNIQUES

BACKGROUND OF THE INVENTION

1. Field of the Invention

This invention relates to tire treads, and more specifically relates to tire treads in which the lengths of repeating design cycles or pitches are modulated in order to control the noise generated when the tire rolls on a road surface.

2. Description of Related Art

In the past, tire treads have been designed by using repeating design cycles extending circumferentially around the periphery of the tire. In most such tire treads, each design cycle or pitch extends across the entire width of the tire tread. However, some prior designers have proposed dividing the tire tread into left and right halves separated by the center line of the tread and using different numbers of design cycles or pitches on the adjacent halves of the tire tread circumference.

SUMMARY OF THE INVENTION

Experience has shown that the preceding prior proposal results in needlessly expensive and difficult mold-making procedures for the resulting tires.

The inventors have discovered that, under certain operating conditions, it is possible to further control the noise generated by a tire tread by using a different sequence of pitches or design cycles on each half of the tire. According to the preferred practice of the invention, each sequence has the same total number of pitches or design cycles. The two sequences are chosen to result in complimentary Fourier spectra, such that the total sound energy generated by the rolling tire is spread as uniformly as possible over the audio frequency spectrum.

DESCRIPTION OF THE DRAWINGS

These and other advantages and features of the invention will hereafter appear for purposes of illustration, but not of limitation, in connection with the accompanying drawing, in which like numbers refer to like parts throughout, and wherein:

The FIGURE is a schematic representation of a portion of the design cycles or pitches of a preferred tire made in accordance with the invention projected onto a flat surface.

DESCRIPTION OF THE PREFERRED EMBODIMENTS

Referring to the drawing, FIG. 1 shows a portion of an exemplary tire 10 having a tread with an outer surface 11. Exemplary tread design cycles, such as 18-28 and 42-53, extend around the circumference of the tire. The design cycles are defined with respect to a circumferentially extending center line CL that defines a center plane passing midway between the sides of the tire tread and perpendicular to the axis of rotation of the tire. Center line CL defines right and left halves of the tire tread Rt and Lt, respectively. A different pitching sequence is used in each of halves Rt and Lt. According to the preferred practice of the invention, 64 pitches are used in both portions Rt and Lt. In portion Rt, three different pitch lengths are used having the ratio 17-21-26. In section Lt, three different pitch lengths are used having the ratio 6-7-9. If the letters S, M and L are used to designate the small, medium and large pitch lengths, the pitch sequence in portion Rt is as follows: S S M M L L L S S L M S L L S M S L L L L L M L M S S L M S M M L S S M M S M M L L S M S L M S M S S M L S S M L L L M L M M M, where S, M and L are the small, medium and large pitch lengths, respectively.

The preferred pitch sequence in portion Lt is as follows: M M M L L S M M M L L S S S M M M L L L S M M S S S L S S M M M L L L S M M S S S L L S M M S S S L L M S S M L L L M S S M L L.

Those skilled in the art will appreciate that the two foregoing sequences are chosen such that they have complimentary Fourier spectra. That is, they are chosen so that the total sound energy is spread as uniformly as possible over the audio frequency spectrum when the two spectra are combined in the left and right portions of a single tire that is rotated over a road surface.

It is possible to predict the frequency spectrum that will be generated by the sequences for the left and right portions of the tire. Those skilled in the art recognize that computer programs capable of such prediction are available and in use. By using the computer program to predict the frequency spectrum, the spectra for the left and right portions can be matched such that the total sound energy is spread as uniformly as possible over the audio frequency spectrum.

Those skilled in the art will recognize that the embodiments described herein may be modified and altered without departing from the true spirit and scope of the invention as defined in the appended claims.

What is claimed is:

1. In a tire adapted to rotate around an axis and having an outer surface defining a circumferentially extending centerline that defines a center plane perpendicular to the axis which divides the tire into first and second portions, the tire including a first series of design cycles having at least first, second and third different lengths extending circumferentially around the tire in the first portion and a second series of design cycles having at least first, second and third different lengths extending circumferentially around the tire in the second portion, an improved arrangement of the design cycles in which:

the number of design cycles in the first and second portions is equal; and the lengths of the design cycles in the first portion substantially have the ratios 17-21-26 and the lengths of the design cycles in the second portion substantially have the ratios 6-7-9.

2. A tire, as claimed in claim 1, wherein the design cycles in the first portion substantially are arranged in the sequence S S M M L L L S S L M S L L S M S L L L L L M L M S S L M S M M L S S M M S M M L L S M S L M S M S S M L S S M L L L M L M M M in which S, M and L represent small, medium and large design cycle lengths, respectively, and wherein the design cycles in the second portion substantially are arranged in the sequence M M M L L S M M M L L S S S M M M L L L S M M S S S L S S M M M L L L S M M S S S L L M S S M L L L M S S M L L in which S, M and L represent small, medium and large design cycle lengths, respectively.

* * * * *